US010394026B2

(12) United States Patent
Potakowskyj et al.

(10) Patent No.: US 10,394,026 B2
(45) Date of Patent: *Aug. 27, 2019

(54) HEAD-UP DISPLAY COMBINER POSITIONING AND LOCKING SYSTEM

(71) Applicant: Jabil Inc., St. Petersburg, FL (US)

(72) Inventors: Christoph Potakowskyj, St. Petersburg, FL (US); Gottfried Hack, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/344,094

(22) Filed: Nov. 4, 2016

(65) Prior Publication Data

US 2017/0052371 A1 Feb. 23, 2017

Related U.S. Application Data

(63) Continuation of application No. 13/656,016, filed on Oct. 19, 2012, now Pat. No. 9,500,864.

(60) Provisional application No. 61/549,999, filed on Oct. 21, 2011.

(51) Int. Cl.
*G02B 27/01* (2006.01)

(52) U.S. Cl.
CPC ..... *G02B 27/0149* (2013.01); *G02B 27/0179* (2013.01); *B60R 2300/205* (2013.01); *G02B 2027/0159* (2013.01)

(58) Field of Classification Search
CPC .......... G02B 27/0149; G02B 27/0179
USPC .................................. 359/629–633
See application file for complete search history.

(56) References Cited

U.S. PATENT DOCUMENTS

| 5,028,119 A | 7/1991 | Hegg et al. |
| 5,457,575 A | 10/1995 | Groves et al. |
| 6,301,053 B1 | 10/2001 | Cheesman |
| 6,618,203 B2 | 9/2003 | Nakamura et al. |
| 7,978,414 B2 | 7/2011 | Potakowskyj et al. |
| 8,081,387 B2 * | 12/2011 | Montarou .......... G02B 27/0149 359/630 |
| 9,116,339 B2 * | 8/2015 | Ruyten .............. G02B 27/0149 359/630 |
| 9,500,864 B2 * | 11/2016 | Potakowskyj ..... G02B 27/0179 |
| 2009/0086329 A1 | 4/2009 | Potakowskyj et al. |

(Continued)

FOREIGN PATENT DOCUMENTS

| GB | 2293861 A | 4/1996 |
| WO | 2007/103030 A2 | 9/2007 |

OTHER PUBLICATIONS

International Preliminary Report on Patentability for PCT/US2012/061123, dated Dec. 12, 2013.

(Continued)

*Primary Examiner* — Zachary W Wilkes
(74) *Attorney, Agent, or Firm* — Young Basile Hanlon & MacFarlane, P.C.

(57) ABSTRACT

A combiner positioning system for a head-up display includes a carrier and a locking element. The carrier supports a combiner for the head-up display, and the combiner is movable between a stowed position and a display position. The locking element has an engaged position and a disengaged position. The locking element engages a portion of the carrier in the display position and rigidly holds the carrier in the display position.

18 Claims, 17 Drawing Sheets

(56) References Cited

U.S. PATENT DOCUMENTS

2010/0157431 A1* 6/2010 Montarou .......... G02B 27/0149
359/630

OTHER PUBLICATIONS

International Search Report and Written Opinion for PCT/US2012/061123, dated Jan. 24, 2013.

* cited by examiner

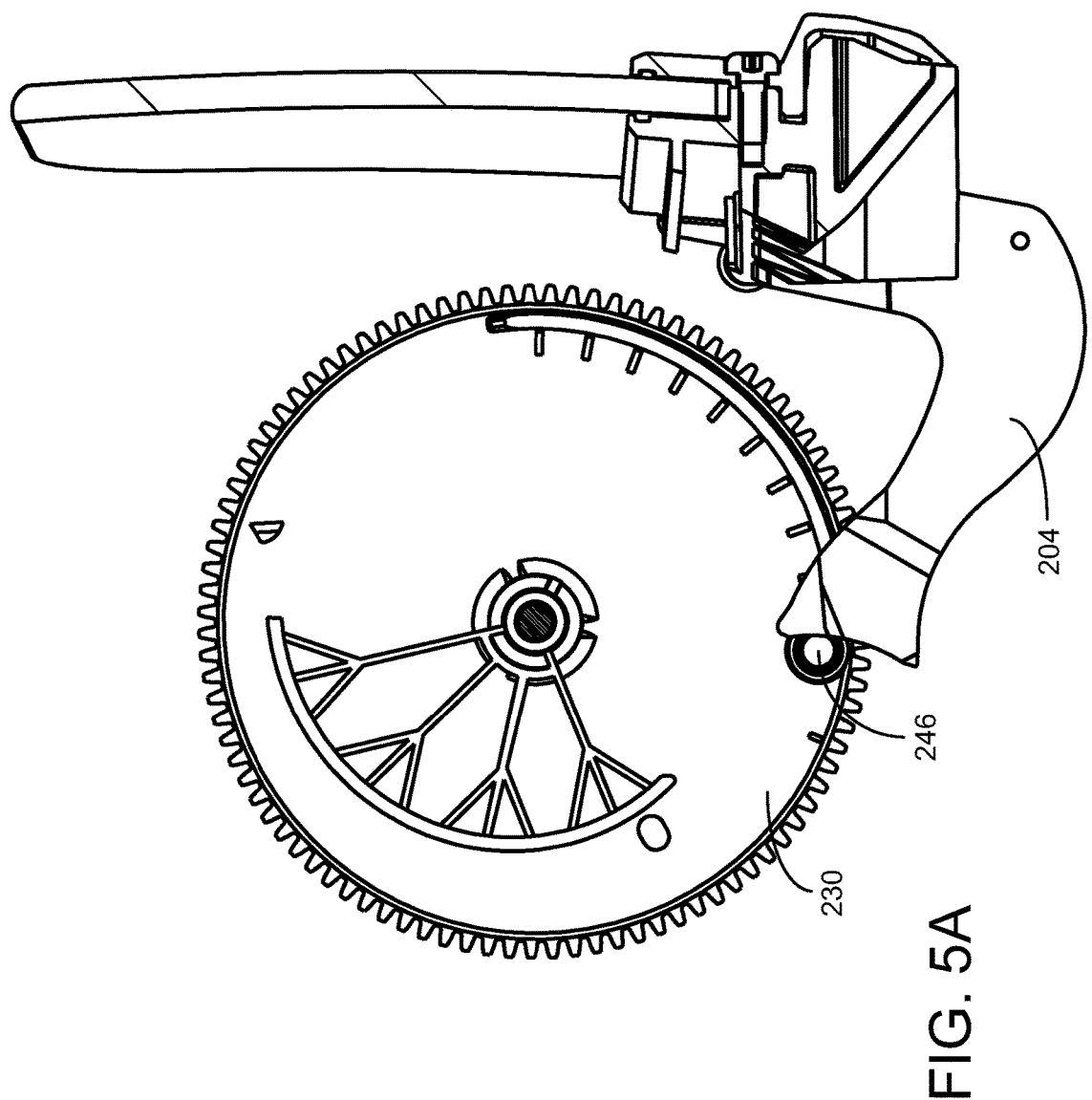

HEAD-UP DISPLAY COMBINER POSITIONING AND LOCKING SYSTEM

CROSS-REFERENCE TO RELATED APPLICATIONS

This application is a continuation of U.S. patent application Ser. No. 13/656,016, filed Oct. 19, 2012, which claims the benefit of U.S. Provisional Application No. 61/549,999, filed Oct. 21, 2011, the entire contents of which are hereby incorporated by reference as if fully set forth.

BACKGROUND

A head-up display (HUD) is a translucent display panel which may be used to present information to a user without requiring the user to divert his or her gaze from a preferred gaze direction. For example, a HUD may be used to present a driver of a vehicle with a variety of information (e.g., speed, fuel consumption, navigation information, time, etc.) while allowing the driver to simultaneously view traffic conditions and the road in front of the vehicle.

A typical HUD includes a combiner, a projector, and a visual data source. The combiner is a translucent panel upon which visual data is projected. The combiner usually includes one or more optical coatings that reflect only the specific wavelengths of monochromatic light which are projected by the HUD projector. Thus, the combiner can be conceptualized as a translucent mirror. The HUD projector is positioned relative to the combiner to allow images, graphics, video, or other visual data to be projected onto the combiner. The combiner then reflects the projected images toward the user.

HUD systems require careful design consideration to ensure reliable performance under a variety of operational conditions. For example, a HUD may be exposed to varying environmental conditions such as high humidity, extreme temperatures, and the presence of contaminants which may cause corrosion. Additionally, when a HUD is implemented in a mobile environment, it is desirable to protect the combiner when the HUD system is inactive to mitigate the potential of damaging the combiner. For this purpose, a positioning system may be used to move the combiner between an active display position and a protected storage position.

Repeatable positional accuracy is important for combiner positioning systems because an improperly positioned combiner will not function properly in a HUD system. Such positional accuracy may be achieved by using high precision parts which are manufactured and maintained to very close tolerances. However, the need for such close tolerances has the undesirable effect of increasing the manufacture and maintenance expense associated with the positioning system.

Further, failure to control vibration associated with the combiner may result in a display that is irritating to the user and unpleasant to view over extended periods. Thus, a positioning system is needed which allows the combiner to move between a protected position and a display position and which reduces undesirable vibration to allow for a pleasant viewing experience.

SUMMARY

In one embodiment, a combiner positioning system for a head-up display includes a carrier supporting a combiner for the head-up display, wherein the combiner is movable between a stowed position and a display position; a locking element having an engaged position and a disengaged position, wherein the locking element engages a portion of the carrier and rigidly holds the carrier in the display position, wherein, when the locking element is in the disengaged position, the locking element does not engage the portion of the carrier and does not restrain the carrier from moving laterally, wherein lateral movement of the carrier is required for the combiner to move between the stowed position and the display position.

In some embodiments, the combiner positioning system further includes an axle extending from the carrier and defining an axis about which the carrier and combiner rotate when in the display position, wherein the locking element urges the axle into a recess and rigidly holds the axle in the recess when in the display position, wherein rigidly holding the axle in the recess increases a resonance frequency of the combiner positioning system.

In some embodiments, the locking element includes a spring configured to exert a spring force for holding the axle in the display position and in some embodiments the locking element is shaped as a lever comprising a lever axle about which the locking element rotates between the engaged position and the disengaged position.

In some embodiments, the combiner positioning system further includes a guide element defining a path along which the carrier moves between the stowed position and the display position. The guide element may contained within a housing and may be a slot in the housing a rail protruding from the housing, or any other means for guiding the combiner between the stowed position and display position.

Additionally, a method of positioning a combiner for a head-up display is disclosed, the method including moving a carrier between a stowed position and a display position, wherein the carrier supports a combiner for the head-up display and engaging a portion of the carrier with a locking element and rigidly holding the carrier in the display position, wherein the locking element, when in a disengaged position, does not engage the carrier and does not restrain the carrier from moving laterally, wherein lateral movement of the carrier is required for the combiner to move between the stowed position and the display position. In some embodiments, the locking element is shaped as a lever comprising a lever axle about which the locking element rotates between the engaged position and the disengaged position.

In some embodiments, the method further includes urging an axle extending from the carrier into a recess and rigidly holding the axle in the recess when in the display position, wherein rigidly holding the axle in the recess increases a resonance frequency of the positioning system. In some embodiments, a spring may be used to hold the axle in the display position.

In some embodiments, the method further includes rotating the carrier and combiner about an axis defined by an axle extending from the carrier when in the display position. In some embodiments, the method further comprises disengaging the portion of the carrier with the locking element and moving the carrier from the displayed position to the stowed position.

In some embodiments, a guide element defines a path along which the carrier moves between the stowed position and the display position. The guide element may be contained within a housing as a slot in the housing, a rail protruding from the housing, or another guiding means.

BRIEF DESCRIPTION OF THE DRAWINGS

FIG. 5A is a drawing showing a half-sectional side perspective view of a camwheel engaging the carrier via a carrier pin extending from the camwheel when the combiner is in the stowed position.

DETAILED DESCRIPTION OF EXEMPLARY EMBODIMENTS

Figure 1:
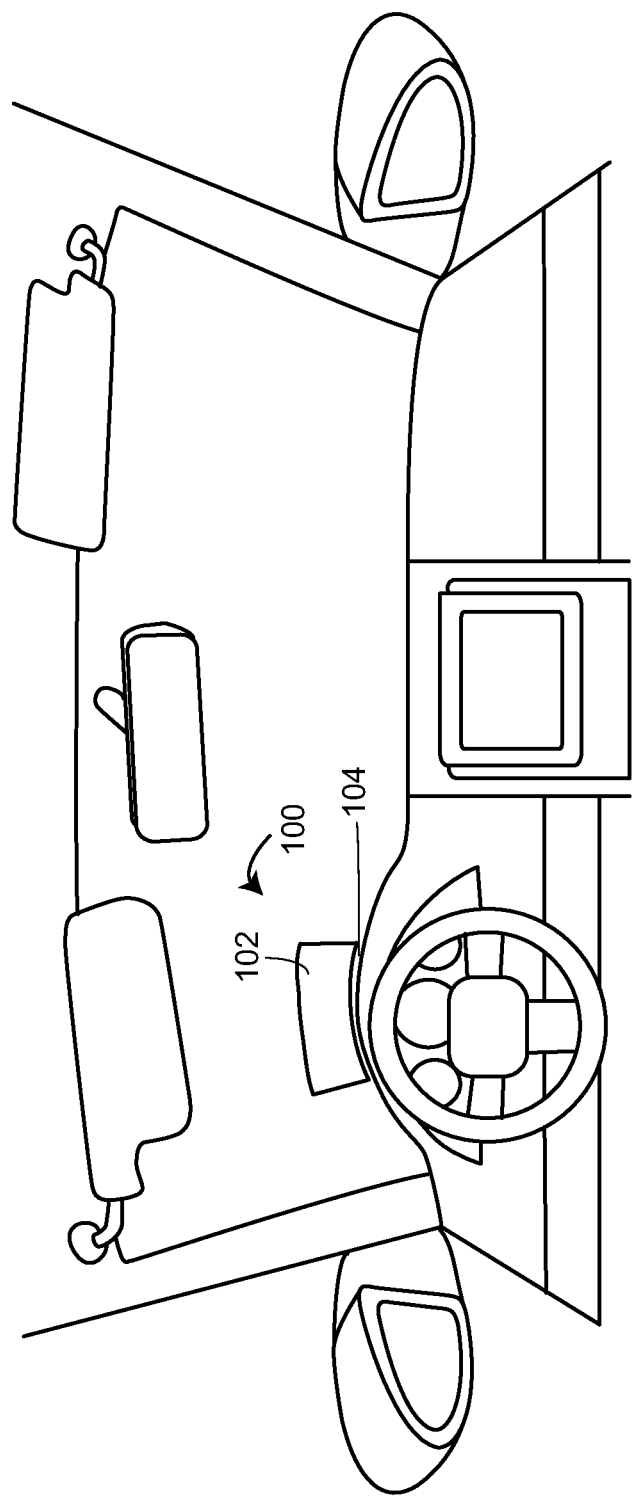
FIG. 1 is a drawing of a head-up display system implemented in a vehicle and shown in the display position.

Referring to FIG. 1, a HUD system 100 implemented in a vehicle is shown, according to an exemplary embodiment. The HUD system 100 may include a combiner 102 positioned between a driver of the vehicle and the windshield. Combiner 102 may protrude from slot 104 when in a display position and may retract into slot 104 when not in use.

HUD system 100 may include a combiner 102. Combiner 102 may be any type of combiner designed for operation in a HUD system or otherwise. For example, combiner 102 may be a translucent or transparent panel formed of a generally planar substrate including transparent or translucent polymers, glass, or other transparent or translucent material. Combiner 102 may be treated with one or more optical coatings selected to reflect specific wavelengths of monochromatic light. Combiner 102 may be a flat panel or may have a curvature.

Combiner 102 may be used in conjunction with a complete HUD system. In such a configuration, the HUD system may also include a light projector, a controller, or a video generator (not shown). The projector may be used to project visual images (e.g., pictures, graphics, video, text, etc.) received from a video generator onto combiner 102, which then reflects the visual images to a user. The projector may be located in the dashboard of the vehicle and oriented upward or at an angle to project light toward combiner 102. However, in other embodiments, the projector may be located elsewhere (e.g., attached to the roof, attached to a visor, etc.) Combiner 102 may be oriented vertically or at an angle such that light projected upon combiner 102 is reflected toward a user.

Still referring to FIG. 1, HUD system 100 may include a slot 104. Combiner 102 may protrude from slot 104 when in a display position as shown in FIG. 1. Additionally, combiner 102 may retract into slot 104 for storage when not in use. Slot 104 may be a hole, slot, gap, space, or other opening through which combiner 102 may extend. Slot 104 may be an opening in an enclosure (e.g., a shell, a frame, a housing, a case, etc.) designed to contain combiner 102, or may exist in a separate component. A combiner positioning system may be used to transport combiner 102 between a display position and a stowed position.

Referring generally to FIG. 2A-FIG. 8, combiner positioning system 200 may move combiner 102 between the stowed position and the display position and rigidly hold combiner 102 in the display position, thereby reducing or eliminating the potential for vibration. Combiner positioning system 200 may use one or more camwheels in conjunction with one or more slots or pins to drive a carrier supporting combiner 102 between the stowed position and the display position. The camwheel(s) may be kinematically linked to a locking element, an angle adjustment support, and/or a flap. Advantageously, all components necessary to transport the combiner between the stowed position and the display position may be operated by the rotation of one or more axially linked camwheels.

Figure 2A:
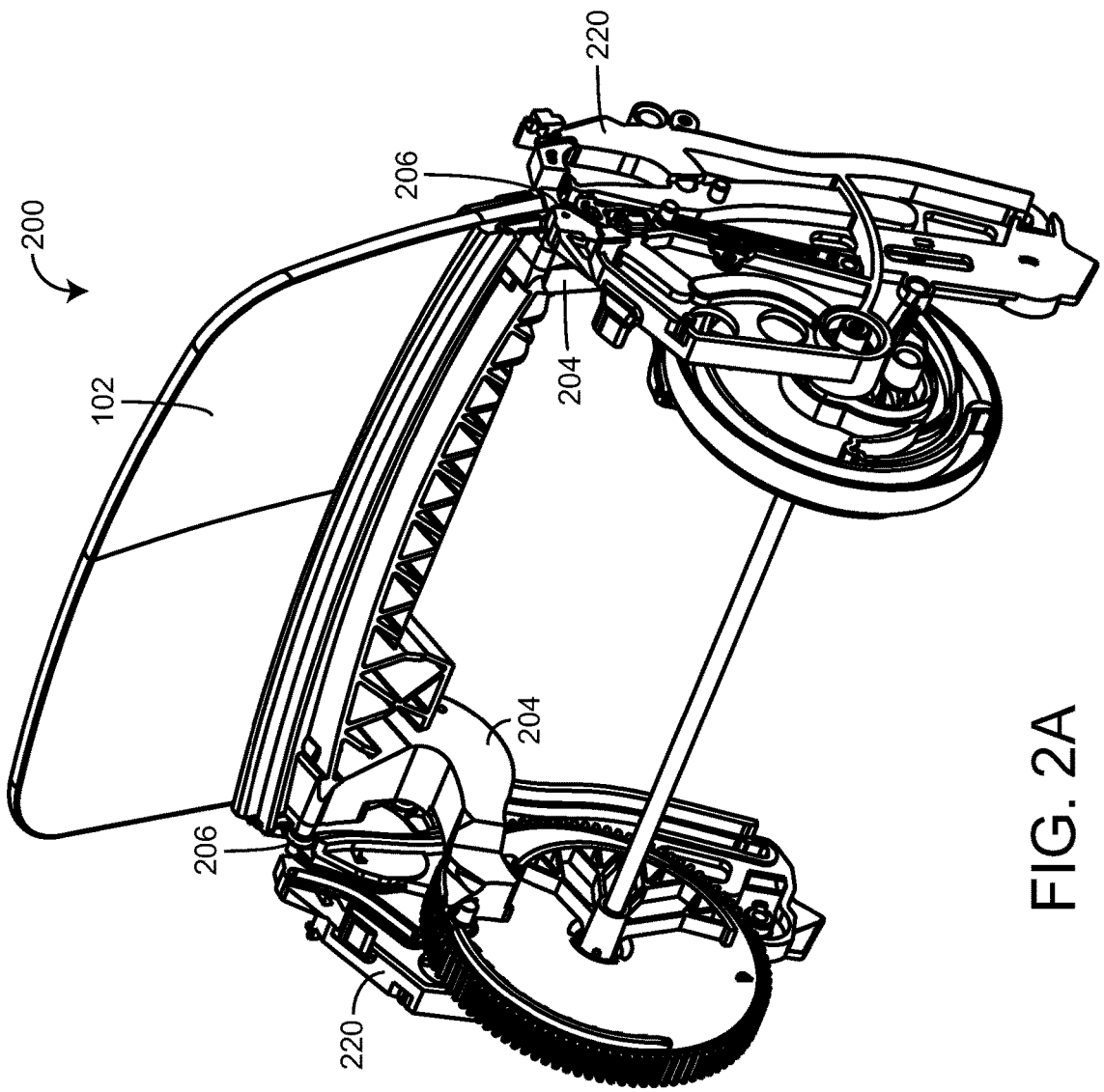
FIG. 2A is a drawing showing a combiner positioning system with the combiner in the display position.
Figure 2B:
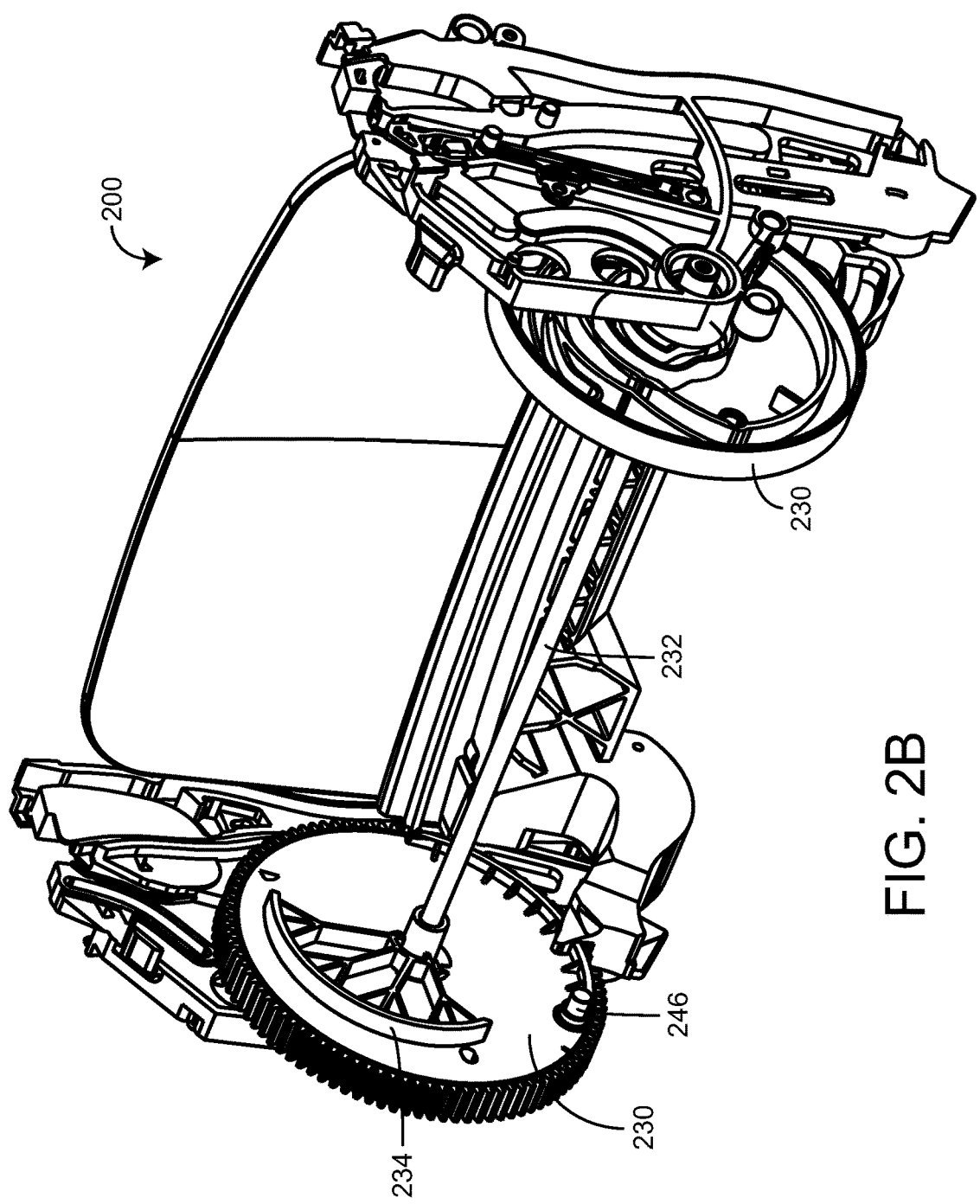
FIG. 2B is a drawing showing the combiner positioning system with the combiner in the stowed position.

Referring now to FIG. 2A and FIG. 2B, a combiner positioning system 200 is shown, according to an exemplary embodiment. FIG. 2A shows combiner positioning system 200 in a display position, whereas FIG. 2B shows combiner positioning system 200 in a stowed position. Referring specifically to FIG. 2A, combiner positioning system 200 may include a carrier 204 for supporting combiner 102, an axle 206 extending from carrier 204 about which carrier 204 and combiner 102 may rotate when in the display position, and a housing 220 for supporting and/or containing other components of system 200.

Still referring to FIG. 2A, combiner positioning system 200 is shown in a display position. Combiner positioning system 200 may include a carrier 204. Carrier 204 may be used to support combiner 102 and may be securely attached to combiner 102 to form a unit. Carrier 204 may extend along a length of combiner 102 and may be secured to combiner 102 by any suitable means (e.g., a clamp, a weld, a fastener, a clip, an adhesive compound, a screw, a bolt, etc.). For example, referring to FIG. 3, combiner 102 is shown fitted into a slot in carrier 204. However, in other embodiments, different or additional securing means may be used. In further embodiments, carrier 204 and combiner 102 may be formed into a single component such that no securing or attaching is required. Carrier 204 may have an upper portion for supporting combiner 102 and a lower portion for engaging a mechanism to transport carrier 204 between the stowed position and the display position.

Referring again to FIG. 2A, combiner positioning system 200 may further include an axle 206. Axle 206 may extend from carrier 204 or may be part of carrier 204. For example, in some embodiments, axle 206 may include two mirrored pins fitted into opposing sides of carrier 204, defining an axis extending through carrier 204 from one pin to the other pin. In other embodiments, axle 206 may include a single rod extending through carrier 204 along the axis. In further embodiments, axle 206 may be combined with carrier 204 or formed as part of a unitary component including both carrier 204 and axle 206. The precise structure of axle 206 is not limiting in this regard.

Still referring to FIG. 2A, in some embodiments, combiner positioning system 200 may include a housing 220. Housing 220 may be used to hold, contain, secure, protect, position, mount, fasten, or otherwise locate the various components of combiner positioning system 200. Housing 220 may be an enclosure, a frame, one or more surfaces, or any other means of orienting, protecting, containing, or positioning one or more elements of system 200. However, housing 220 is not required and should not be interpreted as a limitation on the scope of invention.

Referring now to FIG. 2B, combiner position system 200 is shown to further include one or more camwheels 230, rotatable about camwheel axis 232. Camwheels 230 may include a carrier pin 246 for engaging carrier 204 and an angle adjustment support 234. Combiner positioning system 200 may rotate camwheel 230 and engage carrier 204, thereby moving carrier 204 and combiner 102 between the stowed position and the display position. Angle adjustment support 234 may be used to adjust the angle of combiner 102 or support carrier 204 when in the display position.

Still referring to FIG. 2B, combiner positioning system 200 may include a camwheel 230. Camwheel 230 may be rotatable about a camwheel axis 232. In some embodiments, rotation of camwheel 230 about camwheel axis 232 may be accomplished automatically by any type of motor, drive train system, or power system. In other embodiments, camwheel 230 may be manually rotated either directly or via an intermediate means of interaction (e.g., a handle, a crank, a dial, a wheel, etc.). Camwheel 230 may be any type of material including metals, polymers, woods, natural or synthetic compounds, or any other suitable material. Camwheel 230 is shown to be generally cylindrical in shape, wherein the radius of the camwheel cylinder exceeds the length of the cylinder. However, other camwheel shapes may be used (e.g., square, rectangular, triangular, irregular shape, etc.).

In some embodiments, camwheel 230 may be positioned to one side of combiner 102 (e.g., the left side or right side). However, in other embodiments, multiple camwheels 230 may be used. For example, one camwheel may be positioned on one side of combiner 102 and another camwheel may be positioned on the other side of combiner 102. If multiple camwheels are used, the camwheels may be connected by a shared camwheel axle extending from one camwheel to another camwheel along camwheel axis 232. Thus, rotation of one camwheel or the camwheel axle may cause the other camwheel(s) to rotate. Additionally, if multiple camwheels are used, various components of camwheel positioning system 200 may be positioned relative to one or more of the camwheels, as described below.

Figure 3:
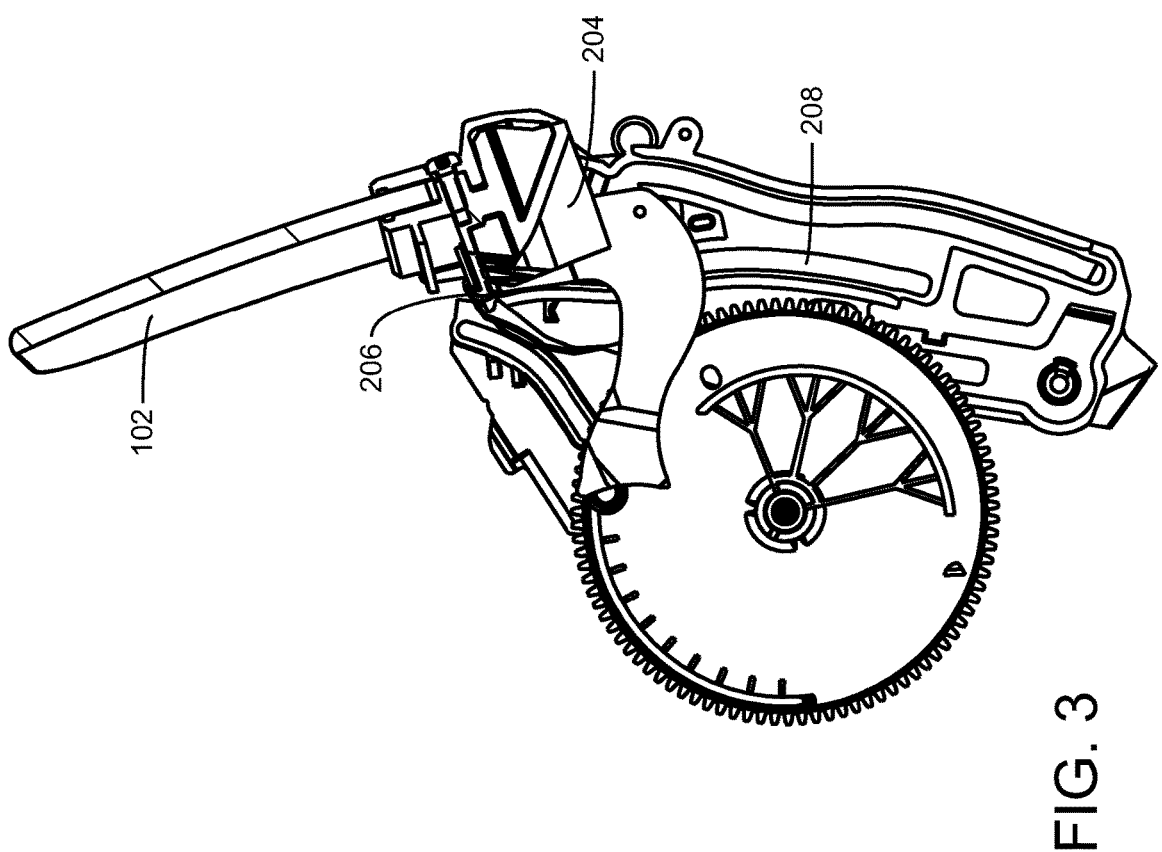
FIG. 3 is a drawing showing a half-sectional side perspective view of the combiner positioning system with the combiner in the display position.

Referring now to FIG. 3, in some embodiments, combiner positioning system 200 may include a guide element 208. Guide element 208 may define a path along which axle 206 moves between a display position and a stowed position. In some embodiments, guide element 208 may be a slot or channel within which axle 206 is constrained. In other embodiments, guide element 208 may be a positive extrusion, protrusion, rail, or other guiding element capable of guiding axle 206 between the stowed position and the display position. For example, guide element 208 may be formed into housing 220 as a slot, as shown in FIG. 3. However, guide element 208 is optional and is not intended to limit the scope of invention unless recited in the claims.

Figure 4A:
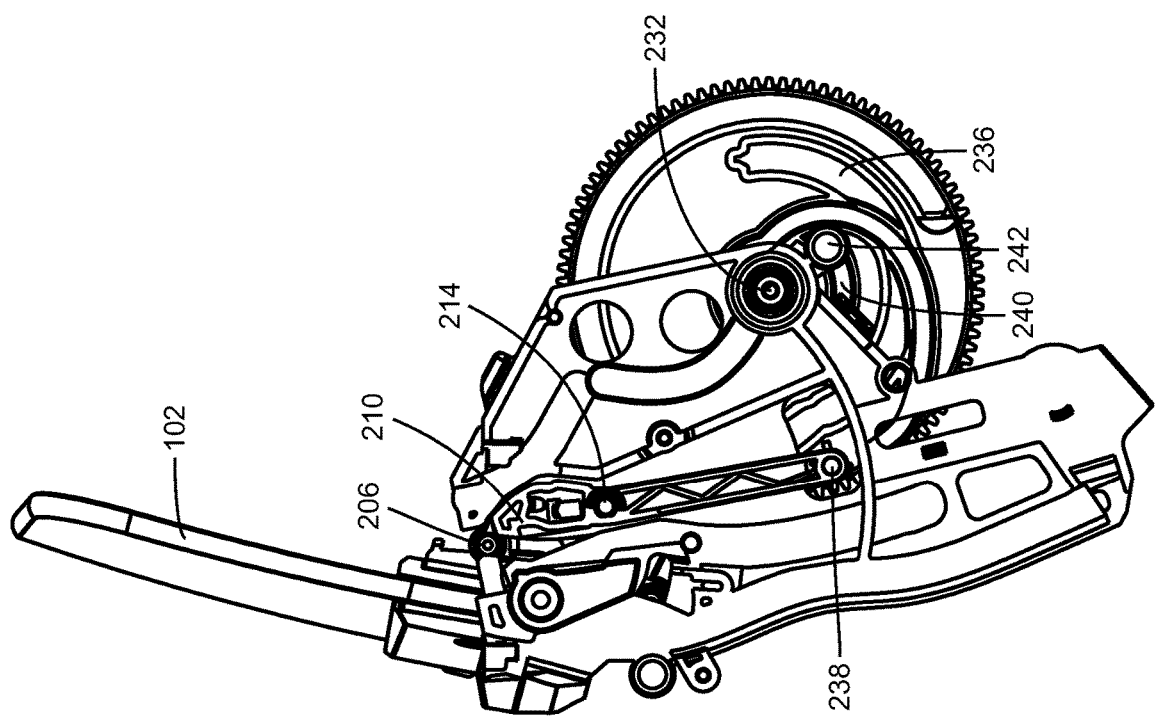
FIG. 4A is a drawing showing a side view of the combiner positioning system with a locking element in a disengaged position.
Figure 4B:
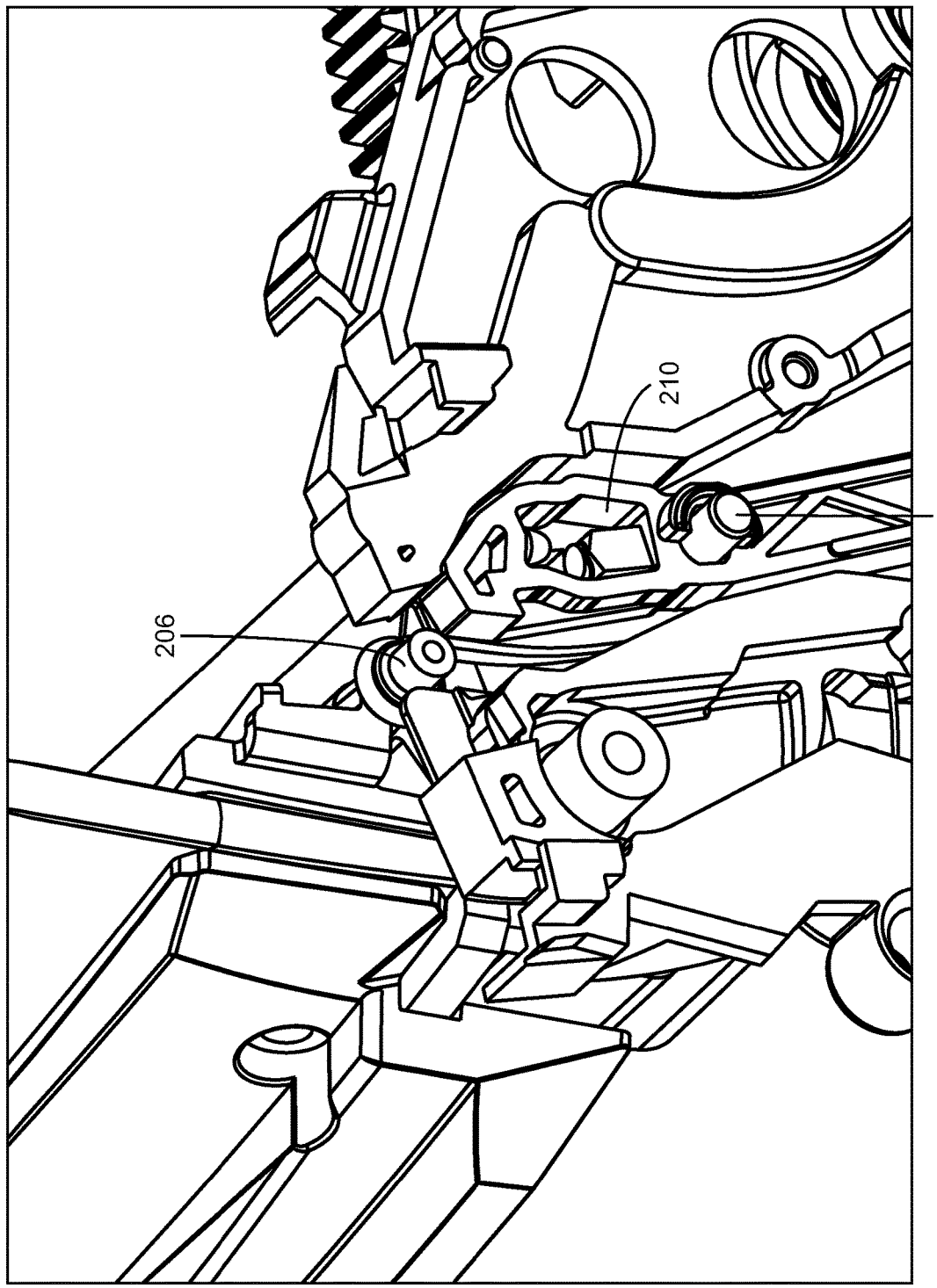
FIG. 4B is a drawing showing a close-up view of a carrier axle in the display position, with the locking element in the disengaged position.
Figure 4C:
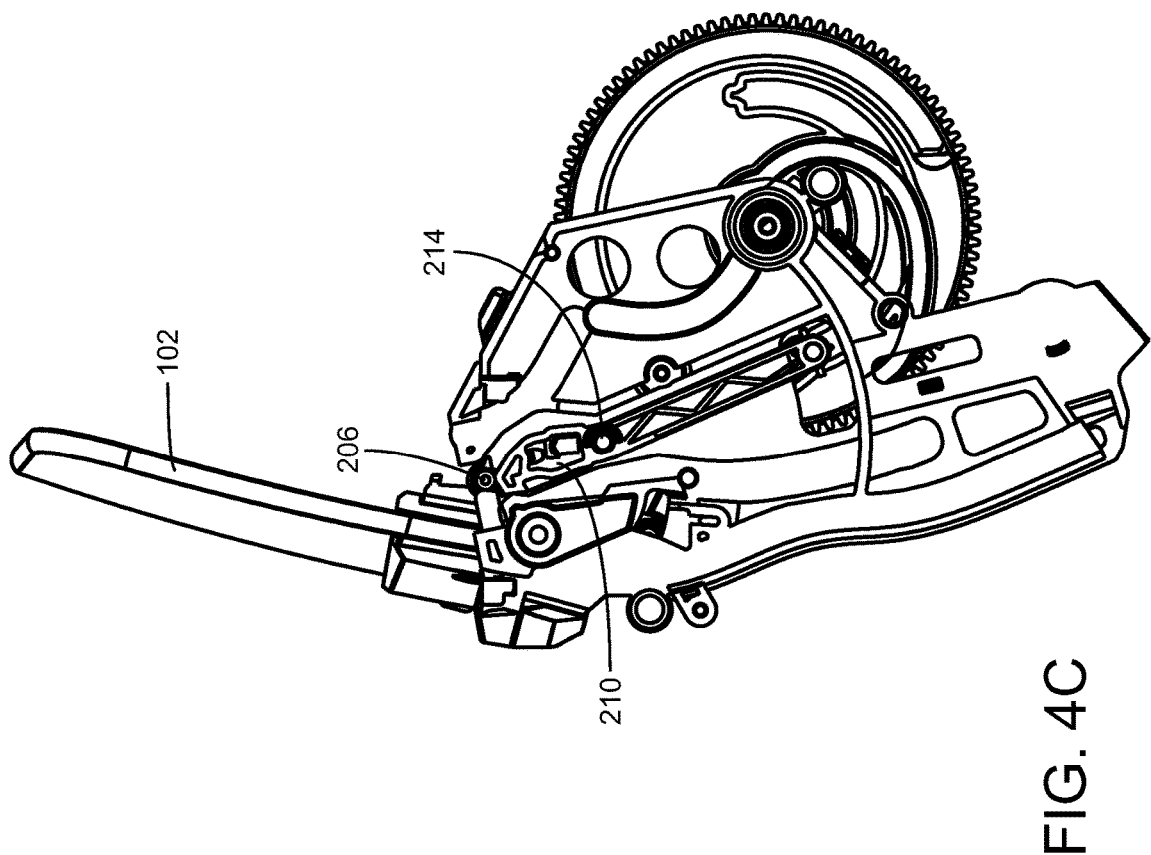
FIG. 4C is a drawing showing a side view of the combiner positioning system with a locking element in an engaged position.
Figure 4D:
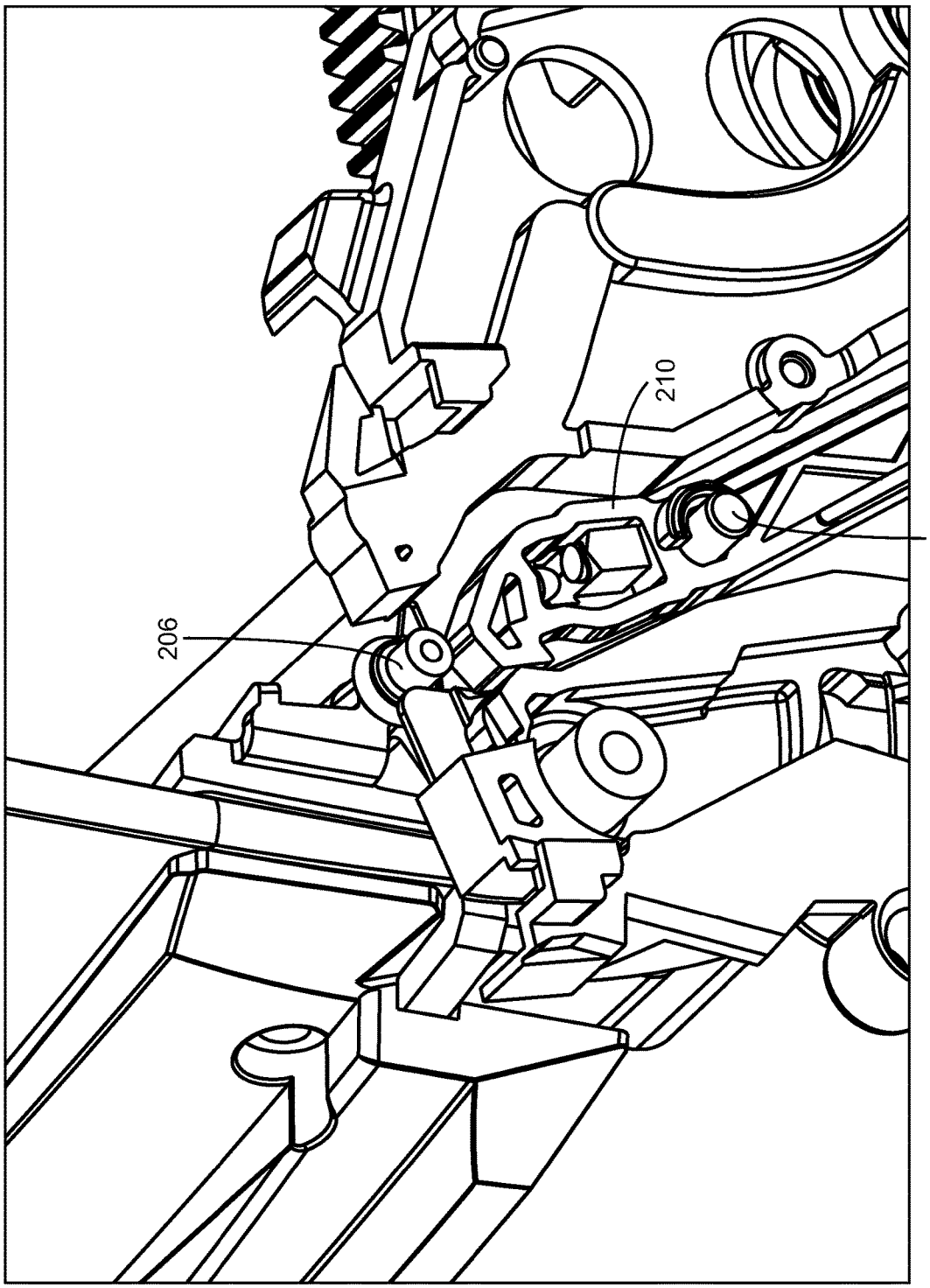
FIG. 4D is a drawing showing a close-up view of the carrier axle in the display position, with the locking element in the engaged position.

Referring now to FIG. 4A-FIG. 4D, combiner positioning system 200 is shown to further include a locking element 210. FIG. 4A and FIG. 4B show locking element 210 in a disengaged position and FIG. 4C and FIG. 4D show locking element 210 in an engaged position. In an exemplary embodiment, locking element 210 may engage axle 206 when combiner 102 is in the display position. Locking element 210 may rigidly hold axle 206 in the display position, thereby reducing the potential for vibration and providing a stable axis about which carrier 204 and combiner 102 may rotate to adjust the display angle of combiner 102.

Locking element 210 may increase the resonance frequency or natural frequency of combiner 102, carrier 204, or combiner positioning system 200 as a whole by restraining axle 206 from moving laterally (e.g., movement along guide element 208 or otherwise) and by providing increased stiffness (e.g., resistance to movement, rigidity, stability, etc.) when locking element 210 engages carrier 204 in the display position. However, locking element 210 does not prevent carrier 204 and combiner 102 from rotating about an axis defined by axle 206 when in the display position. This allows the display angle of combiner 102 to be adjusted in the display position.

In some embodiments, locking element 210 may be shaped as a lever having a lever axle 214. Locking element 210 may rotate about lever axle 214 between a disengaged position (shown in FIG. 4A and FIG. 4B) and an engaged position (shown in FIG. 4C and FIG. 4D). However, in other embodiments, locking element 210 may be shaped as a slider, a clip, a ledge, or any other element capable of securing axle 206 in the display position. When locking element 210 is in the disengaged position, axle 206 may freely move between the display position and the stowed position. However, when locking element 210 is in the engaged position, axle 206 is restrained from lateral movement and is only allowed to rotate.

Figure 4E:
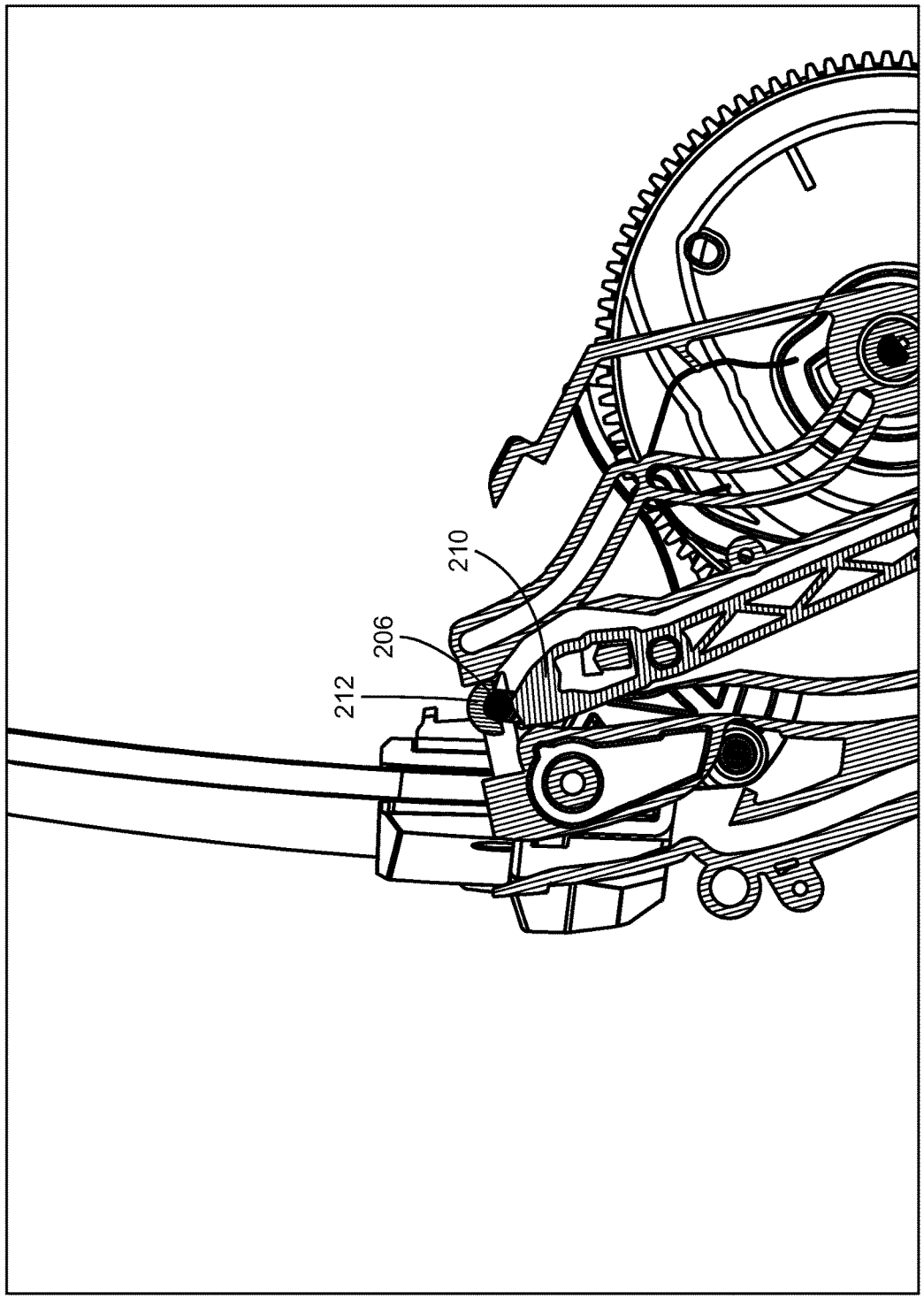
FIG. 4E is a drawing showing the carrier axle rigidly held in a recess by the locking element.

Referring now to FIG. 4E, in some embodiments, locking element 210 may urge axle 206 into a recess 212 located at one end of guide element 208. Recess 212 may provide a secure resting position for axle 206 in the display position. In some embodiments, recess 212 may be a separate fixed or movable part mounted or otherwise rigidly attached to housing 220. In further embodiments, recess 212 may be incorporated into guide element 208 (e.g., an end of guide element 208 may define recess 212) or may be eliminated entirely. Advantageously, recess 212 may be designed to allow carrier 204 and combiner 102 to be removed from housing 220 for repair or replacement without requiring disassembly of the entire combiner positioning system 200.

In some embodiments, a spring (not shown) may be attached to locking element 210. The spring may provide increased resilience for holding axle 206 in the display position when engaged by locking element 210. In some embodiments, the spring may be located on the opposite side of locking element 210 from axle 206, thereby providing a compression force urging locking element 210 and axle 206 toward recess 212. However, in other embodiments, the spring may be located elsewhere (e.g., above recess 212, on the other side of housing 220, etc.). In some embodiments, the spring may exert a tension force rather than a compression force, depending on its location, or may be a rotational spring exerting a torque rather than a force. However, in further embodiments, the spring may be eliminated entirely.

Referring again to FIG. 4A, camwheel 230 may contain a locking element slot 236. Locking element slot 236 may be located in one or more camwheel 230 and may be placed on either side of camwheel 230.

Referring still to FIG. 4A, locking element 210 may be coupled to camwheel 230 via a locking element pin 238. Locking element pin 238 may extend from locking element 210 and may be fitted into locking element slot 236 in camwheel 230. Locking element pin 238 and locking element slot 236 may be positioned on either side of camwheel 230. Locking element slot 236 may be substantially circumferentially oriented relative to camwheel 230. In some embodiments, the radial distance between locking element slot 236 and camwheel axis 232 may vary along the length of the slot 236. Thus, rotation of camwheel 230 may cause locking element 210 to rotate about lever axle 214, thereby moving locking element 210 between the engaged position and disengaged position.

Advantageously, locking element slot 236 may be designed such that locking element 210 engages axle 206 or carrier 204 only when axle 206 is in the display position. Therefore, it may be kinematically impossible for locking element 210 to prematurely move into the engaged position before axle 206 or carrier 204 has reached the display position.

Figure 5B:
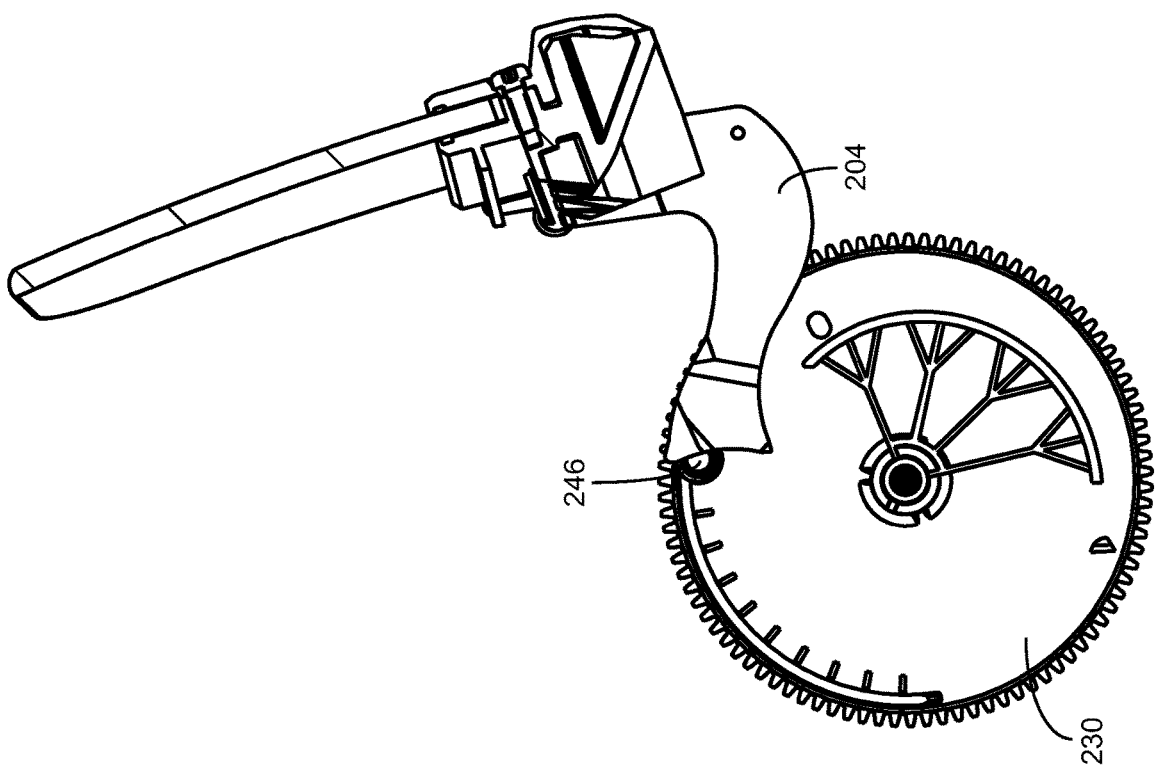
FIG. 5B is a drawing showing a half-sectional side perspective view of the carrier pin disengaging from the camwheel with the combiner in the display position.

Referring now to FIG. 5A and FIG. 5B, a side sectional view of combiner positioning system 200 is shown. Referring specifically to FIG. 5A, camwheel 230 may include a carrier pin 246 extending from the camwheel 230. As camwheel 230 rotates, carrier pin 246 may engage carrier 204. As camwheel 230 continues to rotate, carrier 204 may be moved between the stowed position (shown in FIG. 5A) and the display position (shown in FIG. 5B).

Referring specifically to FIG. 5B, in some embodiments, carrier pin 246 may disengage from carrier 204 once carrier 204 has reached the display position. By disengaging carrier pin 246 from carrier 204, camwheel 230 may further rotate without moving carrier 204 from the display position.

Figure 5C:
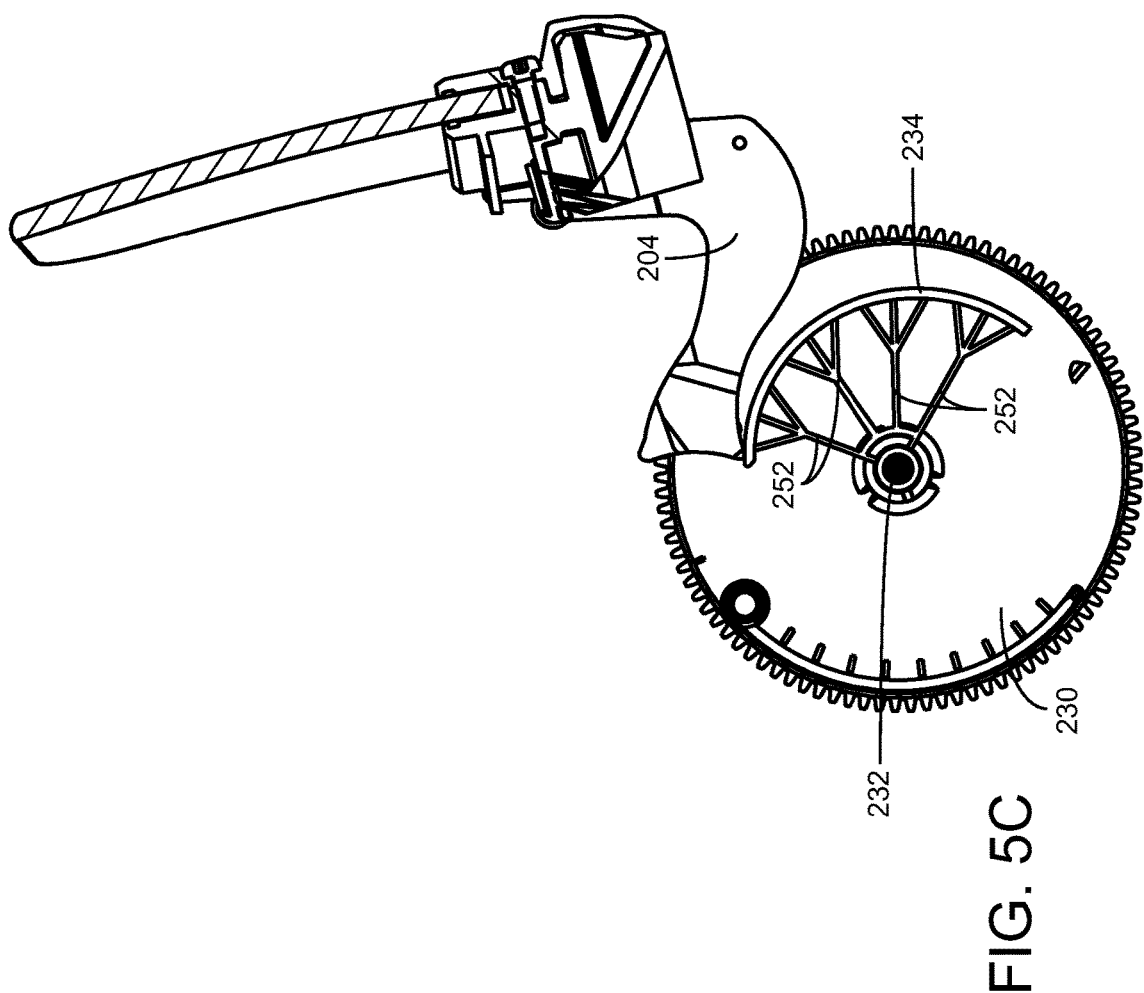
FIG. 5C is a drawing showing a half-sectional side perspective view of an angle adjustment support engaging the carrier with the combiner in the display position.

Referring now to FIG. 5C, camwheel 230 may include an angle adjustment support 234. Angle adjustment support 234 may extend from camwheel 230 and may be generally circumferentially oriented around camwheel axis 232. As camwheel 230 continues to rotate, angle adjustment support 234 may engage carrier 204 in the display position or prior to reaching the display position. In some embodiments, the radial distance between camwheel axis 232 and angle adjustment support 234 may vary along the circumferential length of angle adjustment support 234. Thus, further rotation of camwheel 230 once angle adjustment support 234 has engaged carrier 204 may cause carrier 204 and combiner 102 to rotate about axle 206.

For example, still referring to FIG. 5C, angle adjustment support 234 is shown engaging carrier 204. As camwheel 230 continues to rotate, angle adjustment support 234 may move from the position shown in FIG. 5C to the position shown in FIG. 5D. Therefore, angle adjustment support 234 may be used to adjust the angle of combiner 102 when in the display position in order to more accurately reflect projected light toward a user.

Still referring to FIG. 5C, in some embodiments, angle adjustment support 234 may be a self-locking element. For example, as camwheel 230 rotates, angle adjustment support 234 may urge, press, or force carrier 204 into the display position due to the varying radial distance between angle adjustment support 234 and camwheel axis 232. Once in the display position, some or all of the load (e.g., weight, lifting force, torque) necessary to hold carrier 204 in the display position may be transferred to angle adjustment support 234. Angle adjustment support 234 may rigidly hold carrier 204 in the display position and may be reinforced with ridges 252 extending radially between angle adjustment support 234 and camwheel axis 232. Reinforcing ridges 252 may stiffen the connection between angle adjustment support 234 and camwheel 230, thereby increasing the resonance frequency or natural frequency of combiner 102, carrier 204, or combiner positioning system 200 as a whole.

Figure 6A:
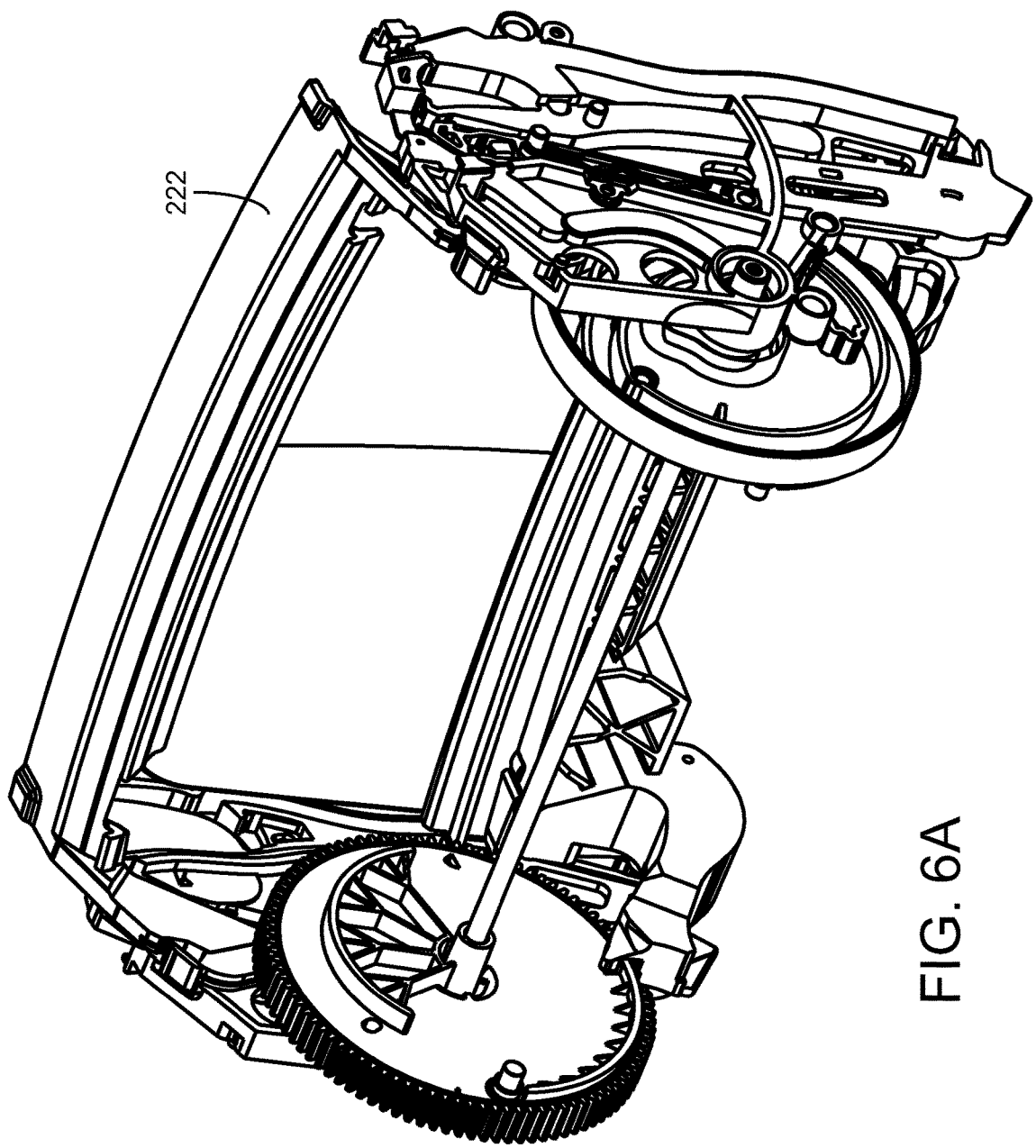
FIG. 6A is a drawing of the combiner positioning system showing a flap in a closed position, covering the combiner in the stowed position.
Figure 6B:
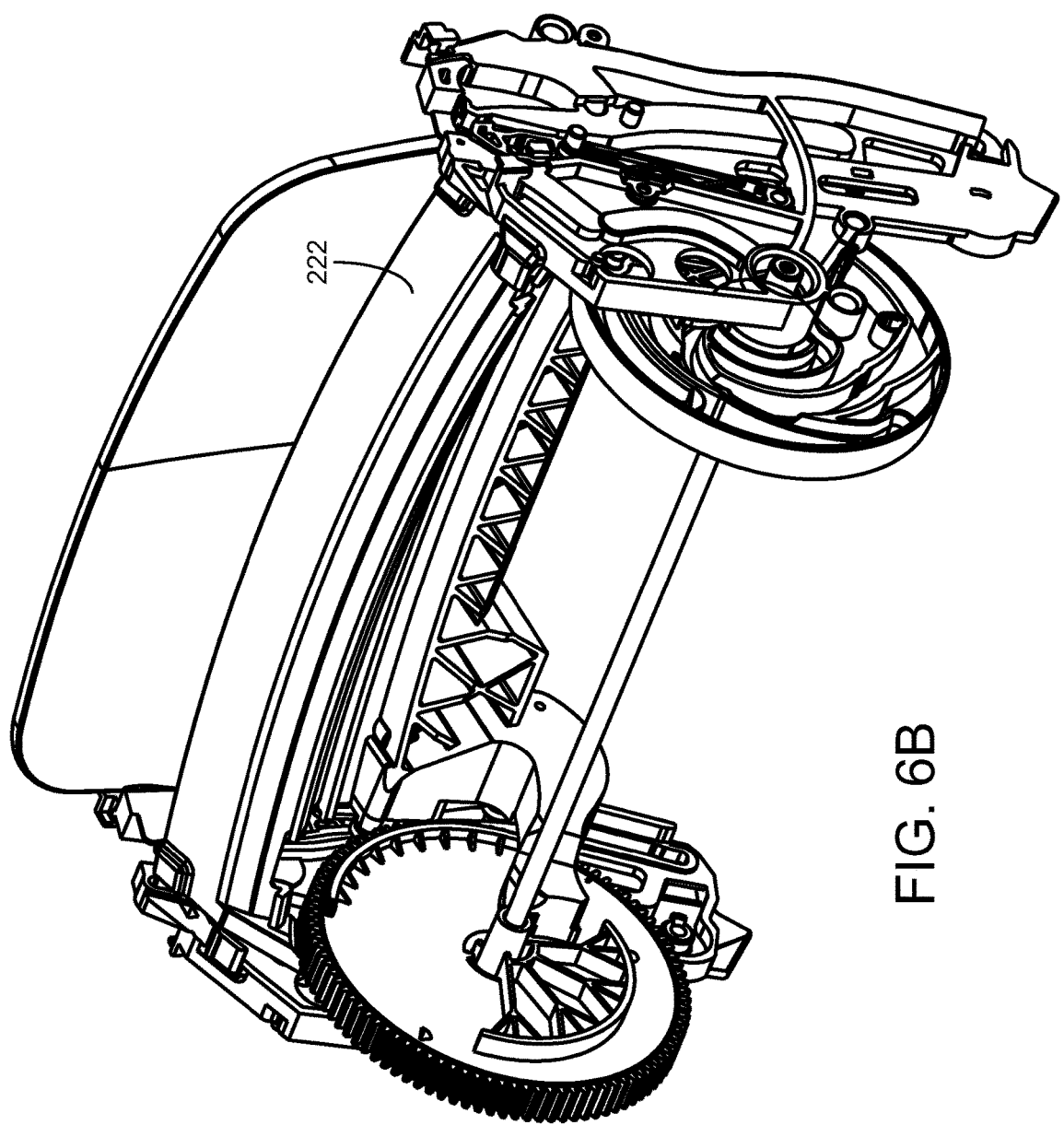
FIG. 6B is a drawing of the combiner positioning system showing the flap in an open position and the combiner partially extended between the stowed position and the display position.

Referring now to FIG. 6A and FIG. 6B, combiner positioning system 200 may include a flap 222. FIG. 6A shows flap 222 in a closed position whereas FIG. 6B shows flap 222 in an open position. Flap 222 may cover a slot or gap (e.g., slot 104) if combiner positioning system 200 is contained within a housing. Flap 222 may be made of any material, including polymers, metals, woods, glass, synthetic or natural compounds, etc. Flap 222 may be rigid, flexible, semi-flexible, or have any intermediate degree of flexibility. Flap 222 may be opaque, translucent, or transparent and may have any color or visual appearance.

In some embodiments, flap 222 may move between an open position and a closed position. For example, in the closed position, flap 222 may cover slot 104, thereby protecting combiner 102 and the other components of combiner positioning system 200 from environmental damage (e.g., pollution, foreign particles, excessive heat, physical, electrical, or chemical damage, etc.). In the open position, flap 222 may retract from, or otherwise expose slot 104 such that combiner 102 may extend through slot 104 into the display position.

Referring again to FIG. 4A, flap 222 may be coupled to camwheel 230 via a flap pin 242. Flap pin 242 may extend from flap 222 and may be fitted into a flap slot 240 in camwheel 230. Flap pin 242 and flap slot 240 may be positioned on either side of camwheel 230. Flap slot 240 may be substantially circumferentially oriented relative to camwheel 230. In some embodiments, the radial distance between flap slot 240 and camwheel axis 232 may vary along the length of the slot 240. Thus, rotation of camwheel 230 may cause flap pin 242 to move relative to camwheel axis 232 and thereby cause flap 222 to retract from or otherwise expose slot 104.

Advantageously, flap slot 240 may be designed (e.g., incorporated into camwheel 230) such that flap 222 is withdrawn from slot 104 via rotation of camwheel 230 before combiner 102 is moved into the space previously occupied by flap 222 when moving combiner 102 into the display position. Therefore, it may be kinematically impossible for combiner 102 to contact flap 222 or to extend into the display position before flap 222 has been withdrawn from slot 104.

In some embodiments, camwheel 230 may be positioned to one side of combiner 102 (e.g., the left side or right side). However, in other embodiments, multiple camwheels may be used. For example, one camwheel may be positioned on one side of combiner 102 and another camwheel may be positioned on the other side of combiner 102. If multiple camwheels are used, the camwheels may be connected by a shared camwheel axle extending from one camwheel to another camwheel along camwheel axis 232. Thus, rotation of one camwheel or the camwheel axle may cause the other camwheel(s) to rotate.

Additionally, if multiple camwheels are used, the various components of camwheel positioning system 200 (e.g., pins 238, 242, and 246, slots 236 and 240, locking element 210, angle adjustment support 234, guide element 208) may be coupled to one or more of the camwheels. For example, locking element 210 may located on only one side of combiner 102 and may be rotated via locking element slot 236 in the camwheel on that side. On the other side of combiner 102, angle adjustment support 234 may be used in place of, or in addition to, locking element 210 and locking element slot 236.

Figure 7:
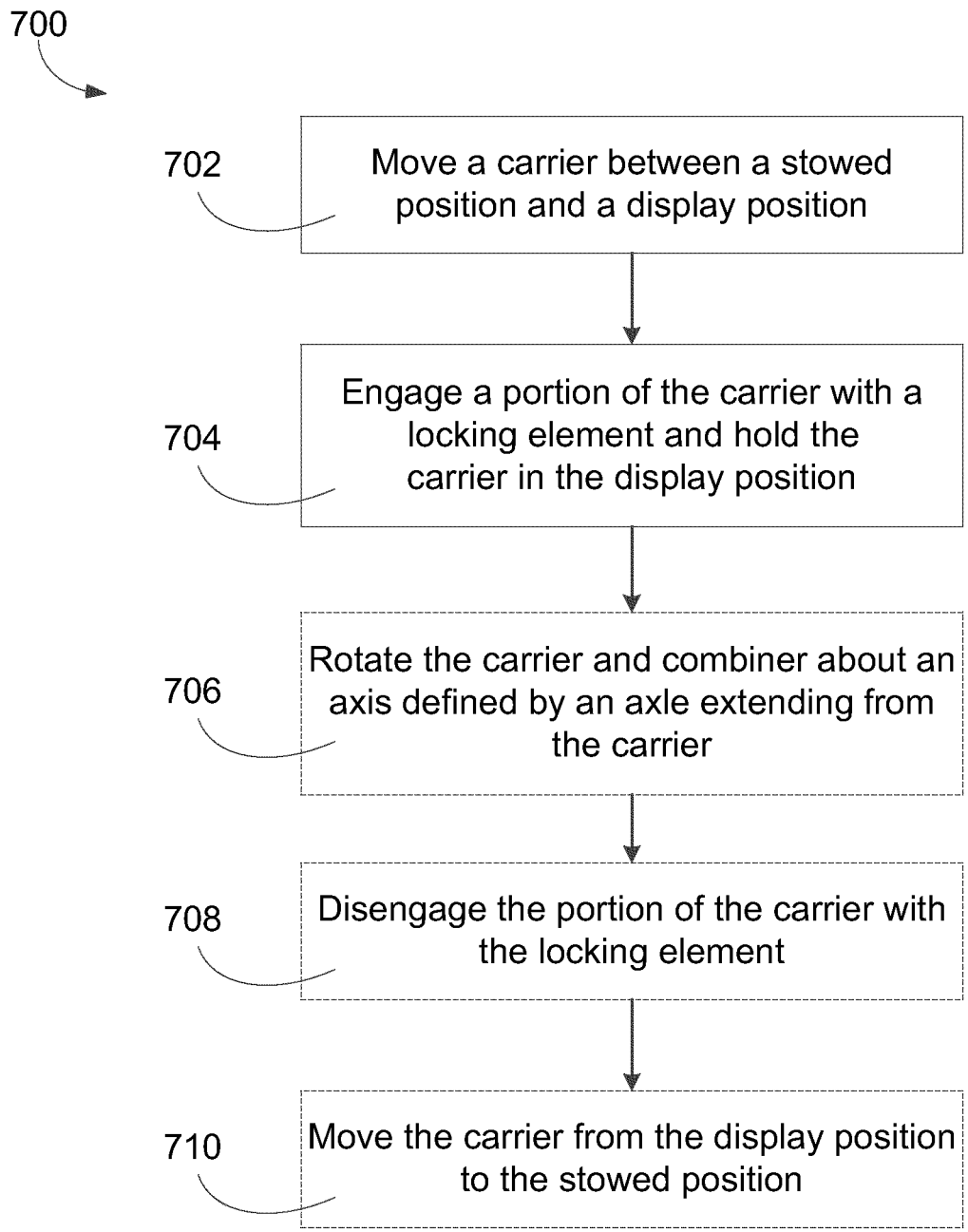
FIG. 7 is a flow chart of a process by which the combiner positioning system operates, including locking the carrier in the display position and rotating the combiner in the display position.

Referring to FIG. 7, a flow chart of a process 700 by which combiner positioning system 200 operates is shown, according to an exemplary embodiment. In brief overview, process 700 may be used to move the combiner between the stowed position and the display position (step 702), and engage a portion of the carrier with a locking element and hold the carrier in the display position (step 704). Optionally, process 700 may also be used to rotate the carrier about a carrier axis (step 706), disengage the portion of the carrier with the locking element (step 708), and move the carrier from the display position to the stowed position (step 710). Steps shown with broken lines around the edges (e.g., step 706-710) are optional depending on the particular configuration of the combiner positioning system.

Still referring to FIG. 7, process 700 is shown to include moving a carrier between a stowed position and a display position (step 702). In some embodiments, axle 206 may extend from carrier 204 and step 702 may be accomplished by moving axle 206 between the stowed position and display position. In some embodiments, step 702 may include moving axle 206 along guide element 208, which may be fastened to or embedded in a housing 220. However, in other embodiments, guide element 208 and housing 220 are unnecessary and may be eliminated. Step 702 may be accomplished using a drive motor or camwheel system to move carrier 204 between the stowed position and the display position. However, in other embodiments, other power systems may be used.

Still referring to FIG. 7, process 700 is shown to further include engaging a portion of the carrier with a locking element and rigidly holding the carrier in the display position (step 704). In some embodiments, step 704 may be accomplished using locking element 210 to engage axle 206 when in the display position and rigidly hold axle 206 in place. In some embodiments, locking element 210 may urge axle 206 into a recess 212 located at one end of guide element 208. However, in other embodiments, recess 212 and guide element 208 are unnecessary. Step 704 may be accomplished using a drive motor or camwheel system to engage the portion of the carrier with the locking element upon reaching the display position. However, in other embodiments, other power systems may be used.

Process 700 is shown to optionally include rotating the carrier and combiner about an axis defined by an axle extending from the carrier (step 706). Step 706 may be performed to adjust the angle of combiner 102 when in the display position in order to more accurately reflect projected light toward a user. Step 706 may be accomplished using a drive motor or camwheel system to rotate carrier 204 and combiner 102 about axle 206. However, in other embodiments, other power systems may be used.

Process 700 is further shown to optionally include disengaging the portion of the carrier with the locking element (step 708) and moving the carrier from the display position to the stowed position (step 710). Steps 708 and 710 may be performed to protect combiner 102 by retracting combiner 102 into housing 220 or another protective component in order to prevent damage to combiner 102 or combiner positioning system 200 when the HUD system is not in use. Step 708 may be accomplished by moving locking element 210 from an engaged position to a disengaged position, thereby allowing axle 206 to move laterally along guiderail 208 or otherwise. If step 706 is optionally performed, it may be necessary to rotate carrier 204 and combiner 102 such that axis 206 may be moved laterally. Then carrier 204 and combiner 102 may be moved from the display position to the stowed position. Step 708 and step 710 may be accomplished using a drive motor or camwheel system to disengage locking element 210, rotate combiner 102 and carrier 204, and move combiner 102 and carrier 204 from the display position to the stowed position. However, in other embodiments, other power systems may be used.

Figure 8:
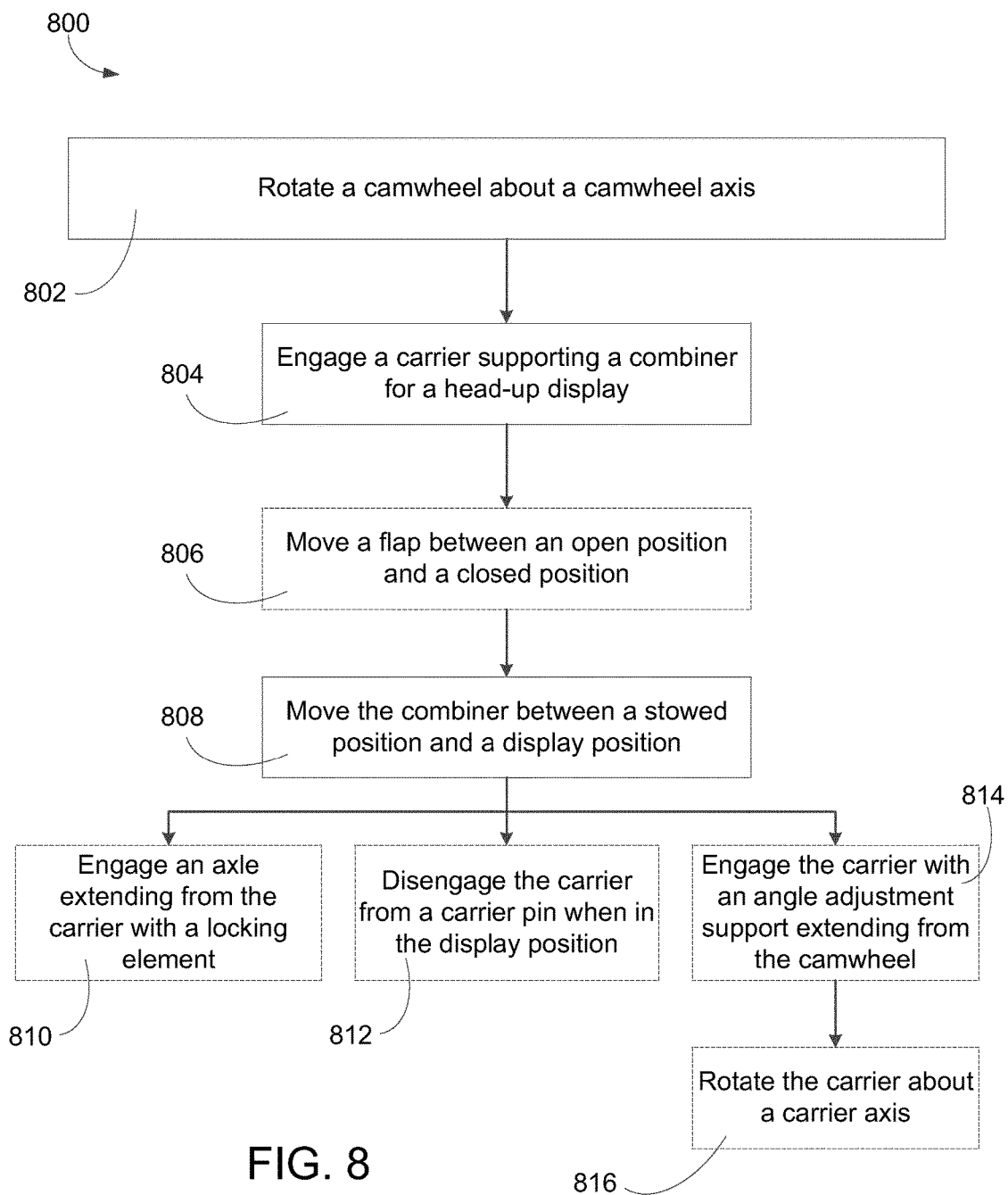
FIG. 8 is a flow chart of a process by which the combiner positioning system operates, emphasizing the role of the camwheel in engaging the carrier and kinematically driving all sub-processes necessary to move the combiner between the stowed position and the display position.

Referring now to FIG. 8, a flow chart of a process 800 by which combiner positioning system 200 may operate is shown, according to an exemplary embodiment. In brief overview, process 800 may be used to move the combiner between the stowed position and the display position (step 808), engage an axle extending from the carrier with a locking element (step 810), engage the carrier with an angle adjustment support (step 814), and rotate the carrier about a carrier axis (step 816). Steps shown with broken lines around the edges (e.g., step 806, and 810-816) are optional depending on the particular configuration of the combiner positioning system. Advantageously, all of steps 804-816 are accomplished by rotating camwheel 230 about a camwheel axis (step 802). In other words, step 802 kinematically drives all other steps of process 800.

For example, rotating camwheel 230 (step 802) may cause carrier pin 246 to engage carrier 204 (step 804) and move carrier 204 along with combiner 102 between the stowed position and the display position (step 808). Optionally, if flap 222 is used in combiner positioning system 200, rotating camwheel 230 may also cause flap 222 to move between an open position and closed position (step 806) prior to moving combiner 102 into the display position (step 808). However, if combiner 102 is being moved from the display position to the stowed position, step 806 would occur after step 808, as the process would be performed in reverse order.

Still referring to FIG. 8, process 800 may include one or more of optional steps 810-814, all of which are also accomplished by continuing to rotate camwheel 230. For example, process 800 may include engaging an axle 206 extending from the carrier 204 with a locking element 210 (step 810). Continued rotation of camwheel 230 may accomplish step 810 by rotating locking element 210 between a disengaged position (shown in FIGS. 4A-4B) and an engaged position (shown in FIGS. 4C-4D) as locking element pin 238 slides along locking element slot 236.

Locking element 210 may discharge the force exerted on carrier pin 246, thereby allowing carrier pin 246 to disengage from carrier 204 (step 812). Once carrier pin 246 has disengaged, camwheel 230 may continue to rotate without affecting the lateral position of carrier 204.

Figure 5D:
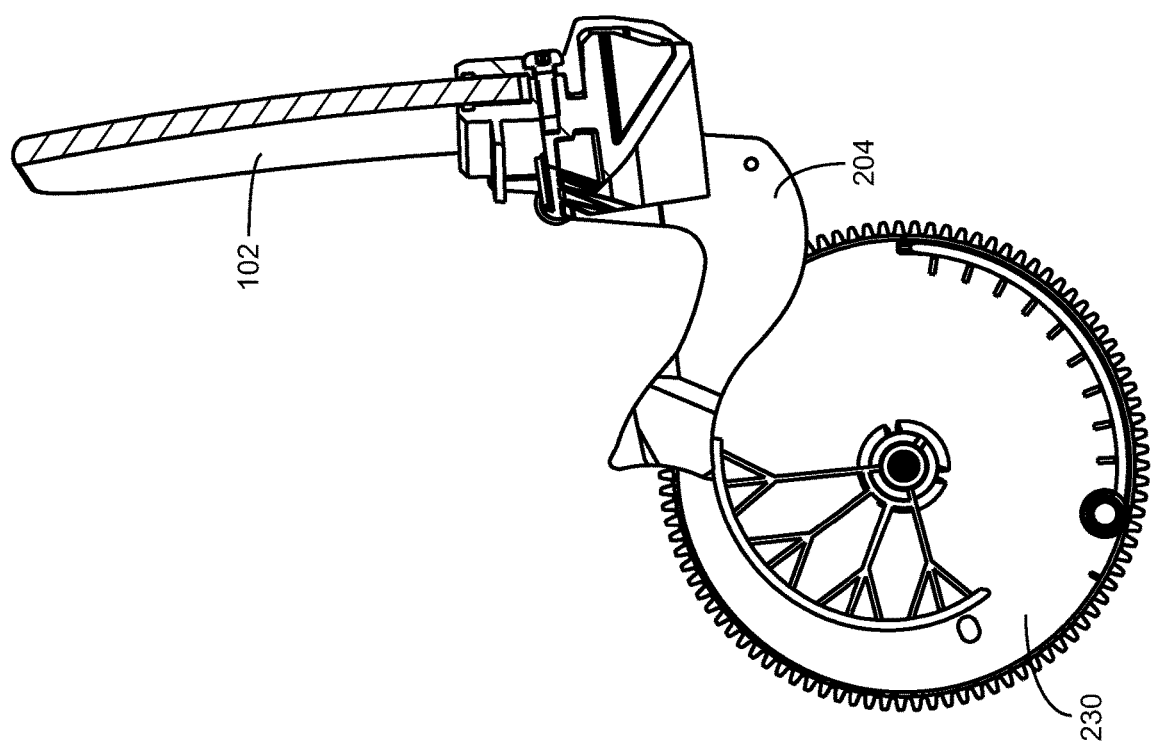
FIG. 5D is a drawing showing a half-sectional side perspective view of the angle adjustment support supporting the carrier in the display position with the combiner fully rotated.

Process 800 may also include engaging the carrier 204 with an angle adjustment support 234 (step 814) as shown in FIG. 5C and FIG. 5D. Angle adjustment support 234 may perform a similar function to locking element 210 by restraining carrier 204 and combiner 102 in the display position (e.g., preventing lateral movement). Additionally, due to the varying radial distance between angle adjustment support 234 and camwheel axis 232 (i.e., one end of angle adjustment support 234 may be closer to axis 232 than the other end), angle adjustment support 234 may cause carrier 204 and combiner 102 to rotate about a carrier axis (step 816) as camwheel 230 continues to rotate.

Advantageously, all steps of process 800 are driven by the rotation of camwheel 230. By rotating camwheel 230 in one direction, all steps necessary to move combiner 102 from the stowed position to the display position, and also several optional steps, are kinematically carried out. Because all moving parts (e.g., pins, levers, support structures, etc.) are directly connected to one or more camwheels, no intermediate elements (e.g., additional gears, wheels, levers, etc.) are required. In other words, all movement, whether rotational, linear, or a combination thereof, are kinematically caused by the rotation of one or more axially coupled camwheels.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

Although the figures may show a specific order of method steps, the order of the steps may differ from what is depicted. Also two or more steps may be performed concurrently or with partial concurrence. All such variations are within the scope of the disclosure.

The invention claimed is:

1. A combiner positioning system for a head-up display, the system comprising:
   a carrier including a combiner and an axle for the head-up display;
   a camwheel engaging the carrier and moving the combiner between a first position and a second position; and
   a locking element engaging the camwheel to permit movement of the locking element between an engaged position and a disengaged position,
   wherein in the engaged position the locking element engages a portion of the axle and rigidly holds the axle against lateral movement and allows rotation of the axle; and,
   wherein in the disengaged position the locking element does not engage the portion of the axle and does not restrain the axle from moving laterally.

2. The system of claim 1, further comprising:
   wherein the locking element urges the axle into a recess and rigidly holds the axle in the recess when the combiner is in the second position, wherein rigidly holding the axle in the recess increases a resonance frequency of the positioning system.

3. The system of claim 2, wherein the locking element is configured to exert a spring force for holding the axle in the second position.

4. The system of claim 1, wherein the locking element is shaped as a lever comprising a lever axle about which the locking element rotates between the engaged position and the disengaged position.

5. The system of claim 1, wherein the lateral movement comprises lateral movement of an axis of the axle along a guide element and the guide element defines a path along which the axle of the carrier laterally moves between the first position and the second position.

6. The system of claim 5, wherein the guide element is contained within a housing.

7. The system of claim 6, wherein the guide element is a slot in the housing.

8. The system of claim 6, wherein the guide element is a rail protruding from the housing.

9. A method for positioning a combiner for a head-up display, the method comprising:
   moving a carrier between a first position and a second position responsive to a camwheel, wherein the carrier includes a combiner and an axle;
   engaging a locking element with the camwheel to permit movement of the locking element between an engaged position and a disengaged position; and
   engaging a portion of the axle with the locking element,
   wherein in the engaged position the locking element engages a portion of the axle and rigidly holds the axle against lateral movement and allows rotation of the axle; and,
   wherein in the disengaged position the locking element does not engage the portion of the axle and does not restrain the axle from moving laterally.

10. The method of claim 9, further comprising:
    urging the axle extending from the carrier into a recess with the locking element; and
    rigidly holding the axle in the recess when in the second position, wherein rigidly holding the axle in the recess increases a resonance frequency of the positioning system.

11. The method of claim 10, wherein a spring force is used to hold the axle in the second position.

12. The method of claim 9, further comprising:
    rotating the carrier and combiner about an axis defined by the axle extending from the carrier when in the second position.

13. The method of claim 9, further comprising:
    disengaging the locking element from the axle portion of the carrier; and
    moving the carrier from the second position to the first position.

14. The method of claim 9, wherein the locking element is shaped as a lever comprising a lever axle about which the locking element rotates between the engaged position and the disengaged position.

15. The method of claim 9, wherein a guide element defines a path along which the axle of the carrier moves between the first position and the second position.

16. The method of claim 15, wherein the guide element is contained within a housing.

17. The method of claim 16, wherein the guide element is a slot in the housing.

18. The method of claim 16, wherein the guide element is a rail protruding from the housing.

* * * * *